United States Patent [19]

Pavelka

[11] Patent Number: 5,285,981
[45] Date of Patent: Feb. 15, 1994

[54] WIRE DISPENSER

[76] Inventor: Steven M. Pavelka, 14910 Crown Dr., Minnetonka, Minn. 55345

[21] Appl. No.: 844,779

[22] Filed: Mar. 2, 1992

[51] Int. Cl.$^5$ ............................................. B65H 16/00
[52] U.S. Cl. ............................... 242/86.50 R; 24/610; 242/129
[58] Field of Search ............... 242/86.5 R, 129, 129.7; 24/610

[56] References Cited

U.S. PATENT DOCUMENTS

| | | | |
|---|---|---|---|
| 1,481,086 | 1/1924 | Fitz | 242/68.3 |
| 3,558,072 | 1/1971 | Wakahara | 242/68.3 |
| 3,934,655 | 1/1976 | Whistle | 242/86.5 R |
| 3,937,411 | 2/1976 | Vogel | 242/68.3 |
| 3,990,653 | 11/1976 | Marcell | 242/129.8 |
| 4,391,422 | 7/1983 | McDonald | 242/86.5 R |
| 4,564,152 | 1/1986 | Herriage | 242/86.5 R |
| 4,611,645 | 9/1986 | Whisnant | 242/86.5 R |

OTHER PUBLICATIONS

Cobra Tools, Inc. catalog entitled "Cobra Tools for the Professional" copyright 1990, pp. 6 and 7, item HCW.
Greenlee Textron Inc., catalog copyright 1989, pp. 85 and 86 No. 910.
Wyrecart, Inc. brochure, marked "6/84" (presumably Jun., 1984).

*Primary Examiner*—Daniel P. Stodola
*Assistant Examiner*—Eileen Dunn
*Attorney, Agent, or Firm*—R. Lawrence Buckley

[57] ABSTRACT

A spooled wire dispenser cart (20) including a central frame (22) and a plurality of spaced spool bars (62). At the free end (66) of each spool bar (62) is a "spool retainer" (74). Each spool retainer (74) includes an elongate element (76) which has an "unblocking position" relative to the spool bar (62) wherein wire spools can be freely slid over the free end of the spool bar (62); and a "blocking position" relative to the spool bar (62) such that wire spools are prevented from sliding over the free end of the spool bar. A preferred wire cart (20) also includes a folding handle (46) which has an extended position useful for maneuvering the cart (20), and a folded position wherein handle (46) is compactly folded against the central frame (22) of cart (20).

5 Claims, 4 Drawing Sheets

WIRE DISPENSER

TECHNICAL FIELD

The present invention relates generally to wire dispensers, and more particularly to dispensers for spooled electrical wire.

BACKGROUND OF THE INVENTION

The electrical wire normally used in commercial and industrial construction is of various types, differing in gauge, number of conductors, color and composition of insulation. Such wire is most commonly supplied in coiled form and quite often on spools. The present invention relates to a device for facilitating the transport of spooled electrical wire from one location to another, and for dispensing the wire at the locations.

Various types of spooled wire dispensers have been commercialized. Some have wheels, to render them more transportable and suitable for larger or more spools; some do not. For present purposes, a wheeled wire dispenser will hereinafter be called a "cart," whereas an unwheeled wire dispenser will hereinafter be called a "caddy." The present invention relates primarily, though not exclusively, to a wire "cart."

Spooled wire dispensers, whether they be carts or caddies, typically include a skeletal frame connected to which are "spool bars" which actually carry the spools. The spool bars are generally horizontal on most spooled wire dispensers. The skeletal frames of typical spooled wire dispensers either include a pair of vertical "uprights" with spool bars spanning horizontally therebetween (the "split upright" type); or a single vertical "central upright" with horizontal spool bars extending outwardly therefrom.

There are several problems with prior spooled wire dispensers. One problem with many cart-type dispensers relates to their handles. A typical spool cart includes a handle attached to its skeletal frame, the handle extending outwardly and/or upwardly from the frame to provide greater leverage for ease in maneuvering the cart. The handle is typically rigidly attached to the skeletal frame, which makes for a strong frame/handle assembly but which also makes the cart more unwieldy when trying to pack or unpack it in or from a vehicle for transport to a new job site. Some prior dispenser handles could be disconnected from the cart frame, but when the handle was so disconnected it could of course be misplaced or damaged.

Another common problem with prior spooled wire dispensers of the central upright type (as distinguished from the split upright type) is retaining the spools on the spool bars. The central upright type of frame is thought to be advantageous, at least for spools in the small to medium size range, in that the spools can be mounted to or dismounted from the spool bars of a "central upright" type dispenser without having to disconnect the spool bars from the upright. The spools can simply be slipped over the free ends of the spool bars. But there must be some way to prevent the spools from falling off the "free ends" of the centrally-supported spool bars. Attempted solutions to this problem include tipping the spool bars slightly such that they angle upwardly, thus employing gravity to retain the spools. The problem with this technique is that it makes the dispenser more expensive (because of the additional cost associated with separately connecting each spool bar at an angle), and also there is the problem of the additional friction between the inner surfaces of the spools and the central frame caused by rubbing between the inner surface of the spool and the central frame. By tilting the spool bars the spools tend to ride in on and rub against the central frame, thus making it more difficult to rotate the spools to dispense wire.

Another common way to retain the spools on centrally-supported spool bars is to use something in the nature of a cotter pin or spring clip. The spring clip technique is clearly less expensive than the inclined spool bar approach discussed immediately above, and inherently there is less friction between the spools and the frame. The problem with prior spring clip designs, however, is that the clips had to be completely disconnected from the free ends of the spool bars in order to slide the spools on or off. The spring clips, once removed, could very easily be misplaced.

Additional problems with prior spooled wire dispensers include the fact that some of them could only dispense wire in one orientation, with the frame horizontal or vertical, but not both; many were bulky and hard to handle and many prior spooled wire dispensers could not hold an adequate number of spools given the wide variety of wire that may be needed at any one job site.

The present invention is directed toward a spooled wire dispenser which addresses the problems discussed above. More particularly, the spooled wire dispenser of the present invention is a "central upright" type dispenser preferably including (i) an improved handle, which can facilitate movement of the dispenser but can also be folded out of the way when it isn't needed; (ii) improved clips at the "free ends" of the spool bars, wherein the clips needn't be completely removed from the spool bars in order to slide spools thereover; (iii) a design which allows dispensing of wire with the frame in either a horizontal or a vertical position; and (iv) an arrangement of spool bars on the central frame of the dispenser which accommodates a wide variety of spool sizes.

SUMMARY OF THE INVENTION

One embodiment of the invention is a spooled wire dispenser including a central frame; a plurality of spool bars supported by and extending outwardly from the central frame; and spool retainer means mounted on the free end of each spool bar, each spool retainer means having a "blocking mode" and an "unblocking mode." When the spool retainer means is in its "blocking mode," wire spools cannot freely slide over the free end of the spool bar, and when the spool retainer means is in its "unblocking mode," a wire spool can freely slide over the free end of the spool bar. In both modes (i.e., blocking and unblocking), the spool retainer means remains operatively connected to the free end of the spool bar.

In a preferred embodiment, when a spool retainer means is in its blocking mode it extends substantially beyond the outer periphery of the free end of the spool bar.

Preferably, the spool retainer means includes an elongate element which is substantially parallel to the spool bar when the spool retainer means is in its unblocking mode, and substantially perpendicular to the spool bar when the spool retainer means is in its blocking mode.

Preferably, the free end of each spool bar forms a notch for receiving the elongate element; and the free end of the spool bar also includes a pin extending across the notch, wherein the spool retainer elongate element is received by the notch and in turn receives the pin.

In a preferred embodiment, one or more resilient elements are used to center the elongate element in the notch discussed above.

Another aspect of the present invention is an elongate handle for a spooled wire dispenser cart, wherein the handle is pivotable and has an extended position whereby significant leverage can be applied to the frame during transport, and a folded position whereby the handle folds compactly against the frame of the cart.

In a preferred embodiment, the spooled wire dispenser cart has two wire dispensing modes, vertical and horizontal, wherein in the horizontal dispensing mode the free end of the handle engages the floor and operatively supports one end of the frame of the cart. The other end of the cart is supported by one or more wheels.

Still another aspect of the present invention is the construction of the central frame of the cart using first and second spaced, substantially parallel, elongate members; and a plurality of spaced spool bars supported by and extending outwardly from the parallel elongate members of the central frame, wherein the spool bars are in a staggered pattern whereby a large number and variety of spools can be accommodated.

Additional aspects, features and advantages of the present invention will be apparent in view of the detailed description of the invention, below, which refers to the appended Drawing, the various figures of which are briefly described below.

DETAILED DESCRIPTION OF THE PREFERRED EMBODIMENT

Figure 1:
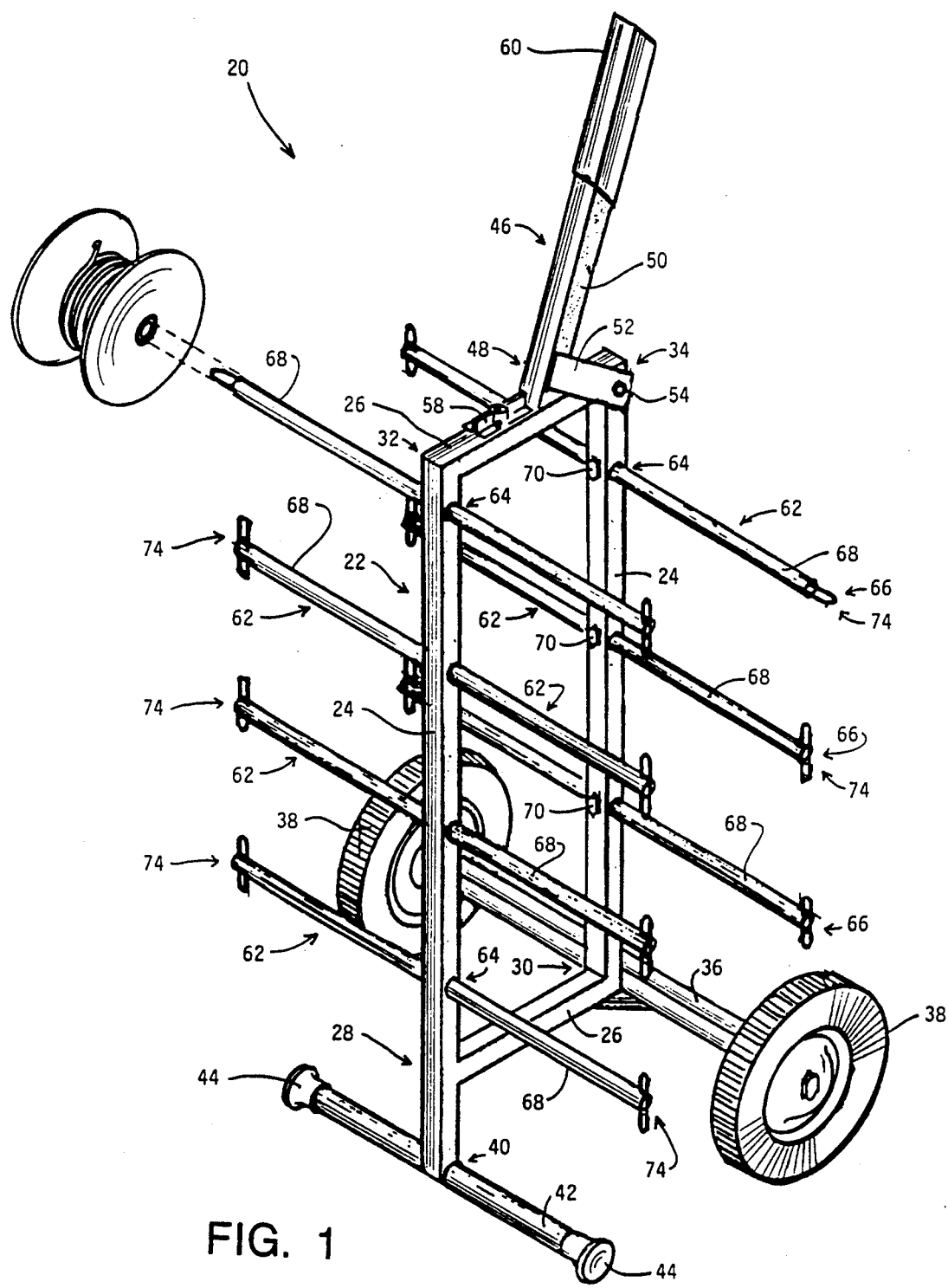
FIG. 1 is a perspective view of a preferred spooled wire dispenser cart according to the present invention, the cart being in its "vertical dispensing mode"
Figure 3:
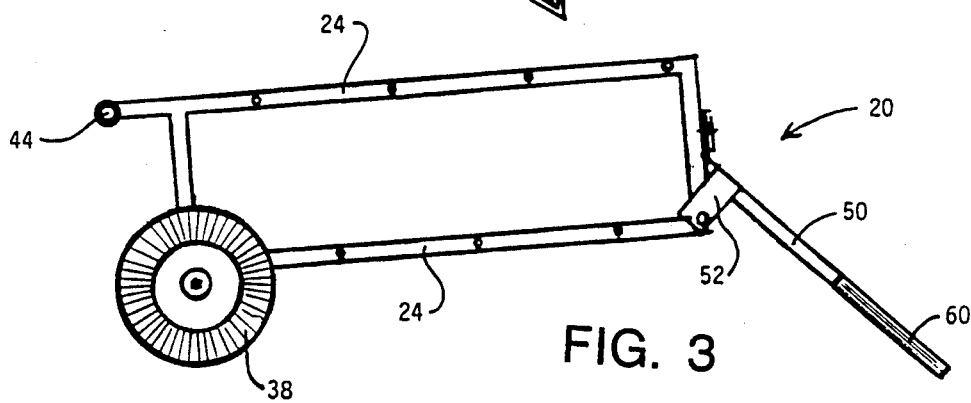
FIG. 3 is a side elevational view of the wire cart of FIG. 1, showing the cart in its "horizontal dispensing model"

With reference to the Drawing, wherein like reference numerals designate like parts and assemblies throughout the several views, FIG. 1 shows a perspective view of a preferred electrical wire dispensing cart 20 according to the invention. Cart 20 includes a substantially rectangular central frame 22 made up of a pair of spaced, parallel, relatively long members 24; and a pair of spaced, parallel, relatively short members 26, wherein the long members 24 are substantially perpendicular to the short members 26. When cart 20 is in its vertical dispensing mode, as shown in FIG. 1, long members 24 are substantially vertical; and when cart 20 is in its horizontal dispensing mode, as shown in FIG. 3, long members 24 are substantially horizontal. Long members 24 and short members 26 combine to form the rectangular central frame 22, the frame 22 having four corners which have been designated 28, 30, 32 and 34 in the Drawing. Frame 22 is preferably made from one inch square steel tubing which is cut to the appropriate lengths and welded.

With reference to FIG. 1, connected to the lower rear corner 30 of frame 22 is a centrally-supported transverse wheel strut 36, the opposite ends of which carry free rolling wheels 38 to facilitate transport of the cart 20. The preferred length of the wheel strut 36 is about 18 inches. Strut 36 is also preferably made of one inch square steel tubing. The preferred diameter of wheels 38 is about 8 inches.

Figure 4:
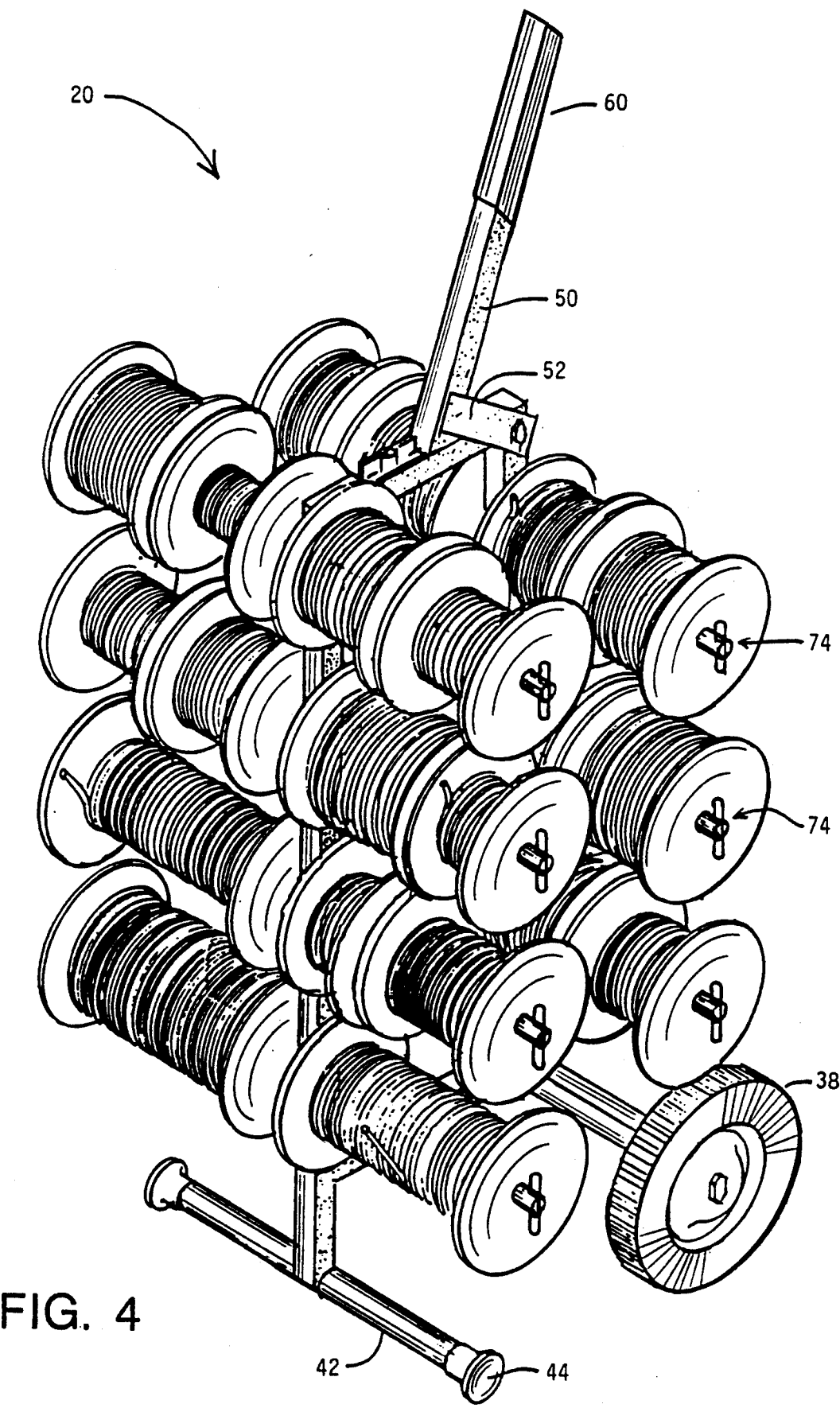
FIG. 4 is a perspective view of the wire cart of FIG. 1, again showing the cart in its "vertical dispensing mode" and showing the cart loaded with spools.

Still with reference to FIG. 1, connected to the lower front corner 28 of frame 22 is a T-shaped front stabilizer 40 which supports the front end of the frame 22 when the frame 22 is in its vertical dispensing mode (as shown in FIGS. 1 and 4). It should be noted that T-shaped front stabilizer 40 extends vertically downwardly from the lower short member 26 of the frame 22 a distance roughly equal to the radius of wheels 38, so that the frame 22 will sit with the long members 24 in a substantially vertical orientation when the cart 20 is in its "vertical dispensing mode." The vertical part of the "T" is preferably simply a downward extension of front frame member 24. Connected to the lower end of the vertical part of the "T" is a horizontal member 42. Each end of the horizontal member 42 of front stabilizer 40, which is preferably made of ½ inch heavy-wall pipe, carries a rubber cap 44 to further enhance stability.

Figure 2:
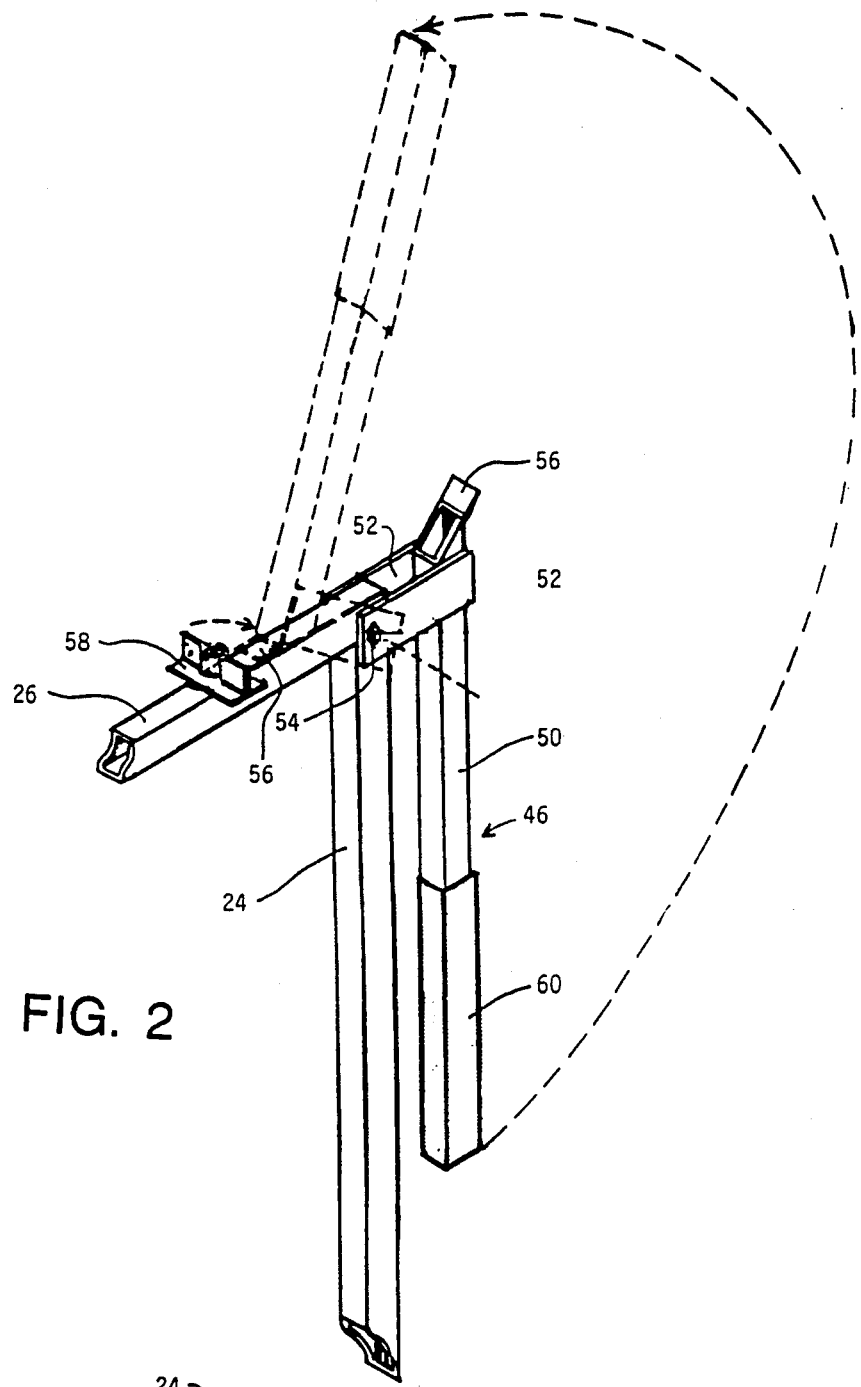
FIG. 2 is an enlarged, partial view of the wire dispenser cart of FIG. 1, showing extended and folded positions of a preferred handle assembly.

Pivotably attached to the upper rear corner 34 of frame 22 is a handle 46. With particular reference to FIG. 2, handle 46 extends upwardly and rearwardly from frame 22 such that it forms roughly a 45° angle relative to the short frame member 26. A secured end 48 of handle 46 is pivotably attached to the upper rear corner 34 of frame 22. Handle 46 includes an elongate element 50 preferably comprised of one inch square steel tubing. At the secured end 48 of handle 46 element 50 carries a pair of horizontally-spaced vertically-oriented steel "tines" 52 which extend substantially perpendicular to element 50. Holes are drilled in tines 52 so that they can accept a bolt or pin 54. The upper rear corner 34 of frame 22 is similarly drilled. Tines 52 sandwich the upper rear frame corner 34 and bolt 54 extends through the tines 52 and through the upper rear corner 34 of frame 22 and as a result the handle 46 can be readily pivoted relative to frame 22.

It should be noted that the handle 46 has two positions, an extended position as shown in FIG. 2 in phantom; and a folded position as shown in FIG. 2 in solid lines. The secured end 48 of handle 46 is cut at a 45° angle so that it rests flush against the upper short member 26 when the handle 46 is in its extended position as shown in FIG. 2 in phantom. Extending from the lower tip of element 50 is a short flat flange 56 which rests flush against upper short member 26 when handle 46 is in its extended position. A simple latch 58 is pivotally connected to the top surface of short member 26, and latch 58 can be pivoted so that a portion of it extends over flange 56 to lock handle 46 in its extended position. Latch 58 can also be pivoted such that it does not extend over flange 56, in which case handle 46 can be pivoted and folded to rest against the back surface of rearwardmost long member 24 (as shown in FIG. 2 in solid line).

The free end of handle elongate element 50 can include a rubber hand grip 60 for ease of use.

Referring again to FIG. 1, extending outwardly from central frame 22 is a plurality of spool bars 62. Each spool bar 62 is generally horizontal, and includes a secured end 64 attached to central frame 22 and a free end 66 opposite thereto. In a preferred embodiment, spool bars 62 are made of one-half inch stainless steel pipe (having an outside diameter of approximately 0.675 inch), and a given piece of stainless steel pipe 68 actually forms a pair of spool bars 62, one on each side of central frame 22. That is, in a preferred embodiment long members 24 of frame 22 are drilled through to receive the stainless steel pipe 68 so that two spool bars 62 can in effect be created from a single piece of stainless steel pipe 68. The pipe 68 which forms spool bars 62 is secured to central frame 22 using a set screw or bolt 70 which is received by a female threaded hole in the central frame 22. The through holes in the central frame 22, for the stainless steel pipe 68 which comprises spool bars 62, are preferably 0.687 inch. The one-half inch stainless steel pipe 68 accommodates virtually all known wire spools. Each spool bar 62 extends outwardly from frame 22 about 10.5 inches.

The spool bars 62 are preferably staggered as shown in FIGS. 1 and 4 so as to accommodate a wide variety of spools. A preferred centerline distance from spool bar 62 to spool bar 62 along a given frame long member 24 is 7 inches. Referring to FIG. 1, the rear or lower long member 24 (depending on whether cart 20 is in its vertical dispensing mode or horizontal dispensing mode, respectively) has its first spool bar 62 spaced at a distance of about 4 inches from the outer periphery of wheel 38 and there are two additional spool bars 62 spaced above the lower spool bar 62 (when cart 20 is in its vertical mode, as shown in FIG. 1). By contrast "front" long member 24 (with reference to FIG. 1) carries eight spool bars 62, four on each side of "front" long member 24, with the "lowermost" spool bars 62 roughly at a distance of 7.5 inches from the centerline of the horizontal member 42 of front stabilizer 40. Three additional sets of spool bars 62 are spaced above these lower spool bars 62 on "front" long member 24. Thus, in the preferred embodiment there are fourteen spool bars in all, eight on the "front" long member 24, and six on the "rear" long member 24. As noted above, the spool bars 62 are preferably staggered such that a given set of spool bars 62 on the "front" long member 24 is roughly mid-way between a pair of "vertically-adjacent" spool bars 62 on the "rear" long member 24. This staggered arrangement accommodates the largest possible number of spools, and the largest diameter spools, as well. Alternate spool bars may be unbolted and removed to accommodate larger diameter spools.

At the free end 66 of each spool bar 62 is a "spool retainer means" 74. The purpose of the "spool retainer means" is to selectively block the free end 66 of the corresponding spool bar 62 so as to selectively allow a spool to slide thereover. Thus, when all of the wire spools are in place, the "spool retainer means" 74 can be put in their "blocking modes" so that the spools cannot freely slide over the free ends 66 of the spool bars 62 and therefore the spools are retained thereon. When it is necessary to mount a spool on a spool bar 62, or dismount a spool from same, it is simply necessary to manipulate the "spool retainer means" 74 to put it into its "unblocking mode."

Figures 5, 6, 7:
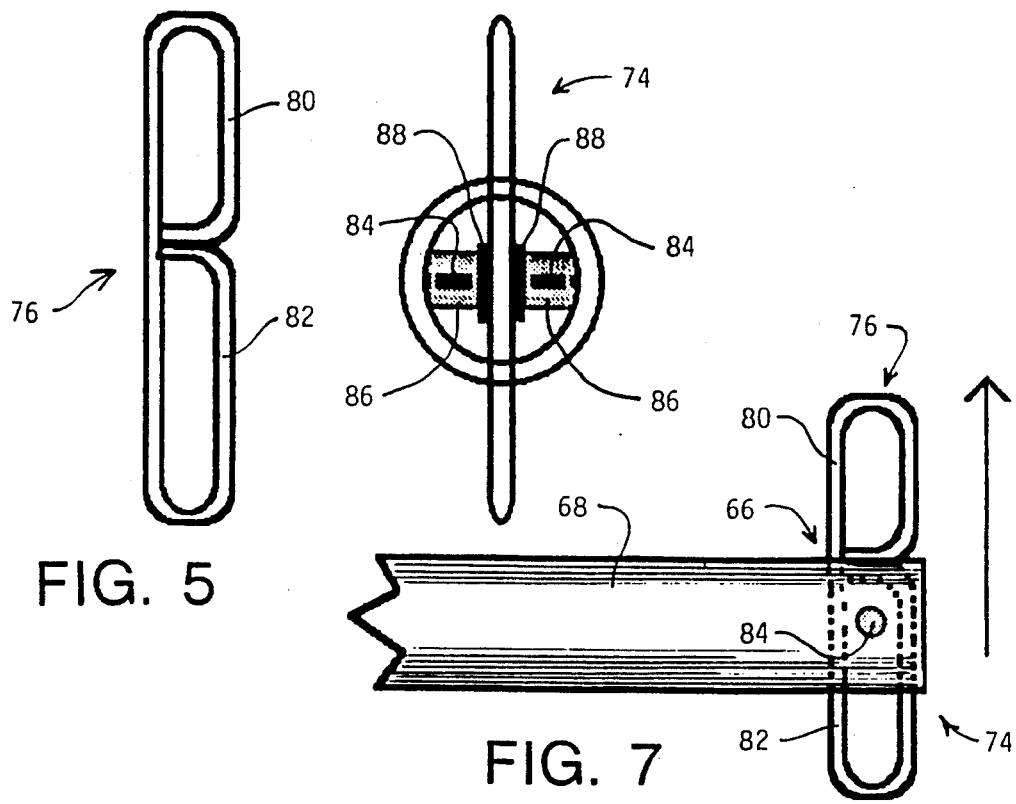
FIG. 5 is a side elevational view of a preferred spool retainer assembly for the wire dispenser cart of FIG. 1.
FIG. 6 is an end elevational view of the spool retainer assembly of the cart shown in FIG. 1.
FIG. 7 is a side elevational view of the spool retainer assembly of FIG. 6.
Figure 8:
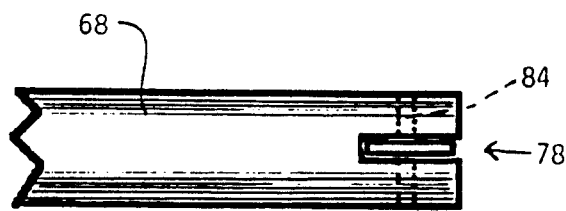
FIG. 8 is a top plan view of the spool retainer assembly of FIG. 6, with an "elongate element" thereof in its blocking position.
Figure 9:
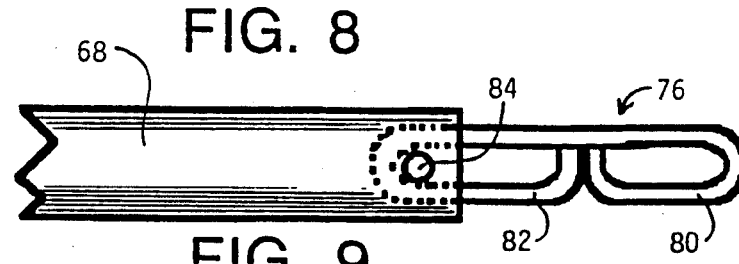
FIG. 9 is a side elevational view of the spool retainer assembly of FIG. 6, with the "elongate element" parallel to the spool bar and in its fully extended position relative to same.
Figure 10:
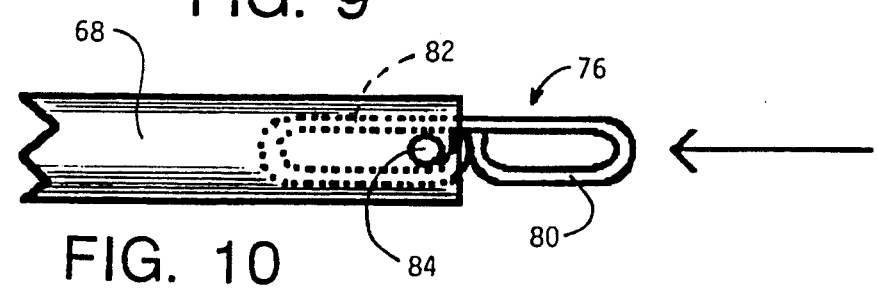
FIG. 10 is a side view of the spool retainer assembly of FIG. 6 in its normal "unblocking mode," with the elongate element inserted into the end of the spool bar.

With reference to FIGS. 5-10, each "spool retainer means" 74 preferably includes an elongate B-shaped element 76 which fits into a notch 78 formed in the spool bar free end 66. With particular reference to FIG. 5 each B-shaped elongate element 76 is formed from a single piece of steel wire, rod or the like which is bent or formed roughly into the shape of a capital B. The upper "lobe" 80 of the B-shaped elongate element 76 is shorter than the lower "lobe" 82 of the elongate element 76. Each "lobe" 80 or 82 has a hollow interior formed by the steel wire or rod being looped around to form a substantially rectangular shape as shown in FIG. 5. The thickness of the steel wire, rod, etc., must be narrower than the spool bars they are intended to be used on.

Extending across each notch 78 in the spool bar free ends 66 is a pin 84. Pin 84, preferably a roll pin, also extends through the interior of the lower lobe 82 of elongate element 76. In a preferred embodiment, there is also an extension spring 86 wound around pin 84 on each side of elongate element 76 as shown in FIG. 6, an end elevational view of a "spool bar retainer means" 74 in its "blocking mode." More particularly, on each side of elongate element 76, and in engagement therewith, is a flat washer 88 and bearing against each flat washer 88 is an extension spring 86 which also bears against the inner surface of the notch or tubular material of the pipe, for example, which forms the spool bar. In a given retainer means assembly, the extension springs 86 in effect center elongate element 76 in the notch 78 so as to prevent the elongate element 76 from "flopping around" in notch 78, given the fact that the width of notch 78 is greater than the diameter of the wire or rod which forms elongate element 76, to prevent binding. Extension springs 86 are not necessary, but they help maintain a slight tension on elongate element 76 and in so doing create a smoother operation of the mechanism. It should be noted that extension springs 86 could be replaced by rubber inserts or any other type of resilient elements.

FIGS. 6 and 7 show the spool retainer assembly or means 74 in its blocking mode. As can be seen, in this mode elongate element 76 is aligned such that it is substantially perpendicular to the pipe 68. When the elongate element 76 is positioned perpendicular to spool bar pipe 68 it is held firmly between the back edge of notch 78 and the roll pin 84. In order to put the retainer means 74 in its "unblocking mode" it is simply necessary to draw the elongate element 76 upwardly until the bottom of the elongate element lobe 82 touches roll pin 84, at which time elongate element 76 can be pivoted about roll pin 84 until elongate element 76 aligns with spool bar pipe 68, and then pushed partially back into the hollow end of spool bar pipe 68.

With reference to FIGS. 6 and 7, it can be seen that when the "retainer means" is in its "blocking mode," elongate element 76 is preferably extending above the outer periphery of the spool bar roughly the same distance elongate element 76 is extending below the outer periphery of the spool bar. This is possible because the lower lobe 82 of the elongate element "B" is considerably longer than the upper lobe 80 of the "B". This asymmetrical shape of the "B" also helps to keep the elongate element 76 in its blocking position, as shown in FIGS. 6 and 7, even when the cart 22 is being transported or otherwise jostled about. This is because the lower lobe 82 of the "B" is obviously heavier than the upper lobe 80 of the "B" and the greater weight of the lower lobe 82 helps prevent the elongate element 76 from inadvertently jumping out of its blocking position. That is, elongate element 76 is held down such that the upper inner surface of the bottom lobe 82 of the "B" continues to rest on the roll pin 84. It should also be noted that the friction of the spring/washer assembly helps to keep the elongate element from jumping or falling out of the elongate element's intended position.

A preferred embodiment of the invention is described above. Those skilled in the art will recognize that many embodiments are possible within the scope of the invention. Variations and modifications of the various parts and assemblies can certainly be made and still fall within the scope of the invention. For example, standard spring clips could be used in lieu of the preferred "spool retainer means" 74 described above. Thus, the invention is limited only to the apparatus and method recited in the following claims, and equivalents thereof.

I claim:

1. A spooled wire dispenser, comprising:
   A. a central frame;
   B. a plurality of spaced, substantially horizontal spool bars supported by and extending outwardly from the central frame, each spool bar having a secured end connected to the frame and a free end opposite thereto; and
   C. spool retainer mans mounted on the free end of each spool bar for selectively allowing a wire spool to slide thereover, each spool retainer means having
      (1) a blocking mode wherein a wire spool cannot freely slide over the free end of the corresponding spool bar, and
      (2) an unblocking mode wherein a wire spool can freely slide over the free end of the corresponding spool bar, wherein the spool retainer means remains operatively connected to the free end of the spool bar in the blocking and unblocking modes of the spool retainer means; wherein:
      a. when each spool retainer means is in the blocking mode the spool retainer means extends substantially beyond the outer periphery of the corresponding spool bar, and when each spool retainer means is in the unblocking mode the spool retainer means does not extend substantially beyond the outer periphery of the corresponding spool bar;
      b. each spool retainer means comprises an elongate element which is substantially parallel to the corresponding spool bar when the spool retainer means is in the unblocking mode and is substantially perpendicular to the corresponding spool bar when the spool retainer means is in the blocking mode;
      c. the free end of each spool bar is tubular, having a thin peripheral wall and a hollow center, the peripheral wall forming a pair of notches which are parallel to one another and to the corresponding spool bar, the notches receiving the corresponding spool retainer elongate element when the elongate element is in the blocking mode, and the free end of each spool bar comprises a pin extending across and perpendicular to the notches; and
      d. each spool retainer elongate element forms an elongate slot having a first end located near the middle of the elongate element and a second end located near one end of the elongate element, and the elongate slot receives the pin extending across the notches in the free end of each spool bar, wherein when the elongate element is in the unblocking mode the end thereof forming the elongate slot is received by the hollow free end of the spool bar with the pin located at the first end of the elongate slot, and wherein when the elongate element is in the blocking mode the pin is also located at the first end of the elongate slot in the elongate element; wherein to convert the elongate element from the unblocking mode to the blocking mode the elongate element is (i) pulled axially out of the hollow end of the spool bar to the point where the pin is located at the second end of the elongate slot in the elongate element; (ii) rotated 90 degrees into a position perpendicular to the spool bar; and (iii) positioned such that the pin is once again located at the first end of the elongate slot in the elongate element, wherein the elongate element is held in the blocking mode by the notches and the pin, whereby the elongate element can assume the blocking mode without bearing against a wire spool and the wire spool can therefore spin freely on the spool bar when the corresponding elongate element is in the blocking mode.

2. The spooled wire dispenser of claim 1, wherein each spool retainer means further comprises a resilient element for centering the elongate element in the notch at the free end of the spool bar.

3. The spooled wire dispenser of claim 1, wherein each spool retainer elongate element is generally in the shape of an upper case B having a pair of lobes, wherein the elongate slot which receives the pin spanning across the notches in the free end of each spool bar is formed in one of the lobes of the B-shaped elongate element.

4. The spooled wire dispenser of claim 3, wherein the lobe of each B-shaped elongate element which forms the elongate slot is longer than the other lobe of the B-shaped elongate element.

5. The spooled wire dispenser of claim 1, wherein the peripheral wall of the hollow free end of each spool bar has an inner surface to which the corresponding pin is connected, and wherein each spool retainer means further comprises a pair of springs and a pair of washers, each spring being coiled about the pin spanning across the notches in the free end of the spool bar, wherein the springs each have an outer end which bears on the inner surface of the peripheral wall, and an inner end bearing on one of the washers which in turn bears on the elongate element, wherein the springs act in combination to center the elongate element in the notches at the free end of the spool bar.

* * * * *